United States Patent Office 3,086,065
Patented Apr. 16, 1963

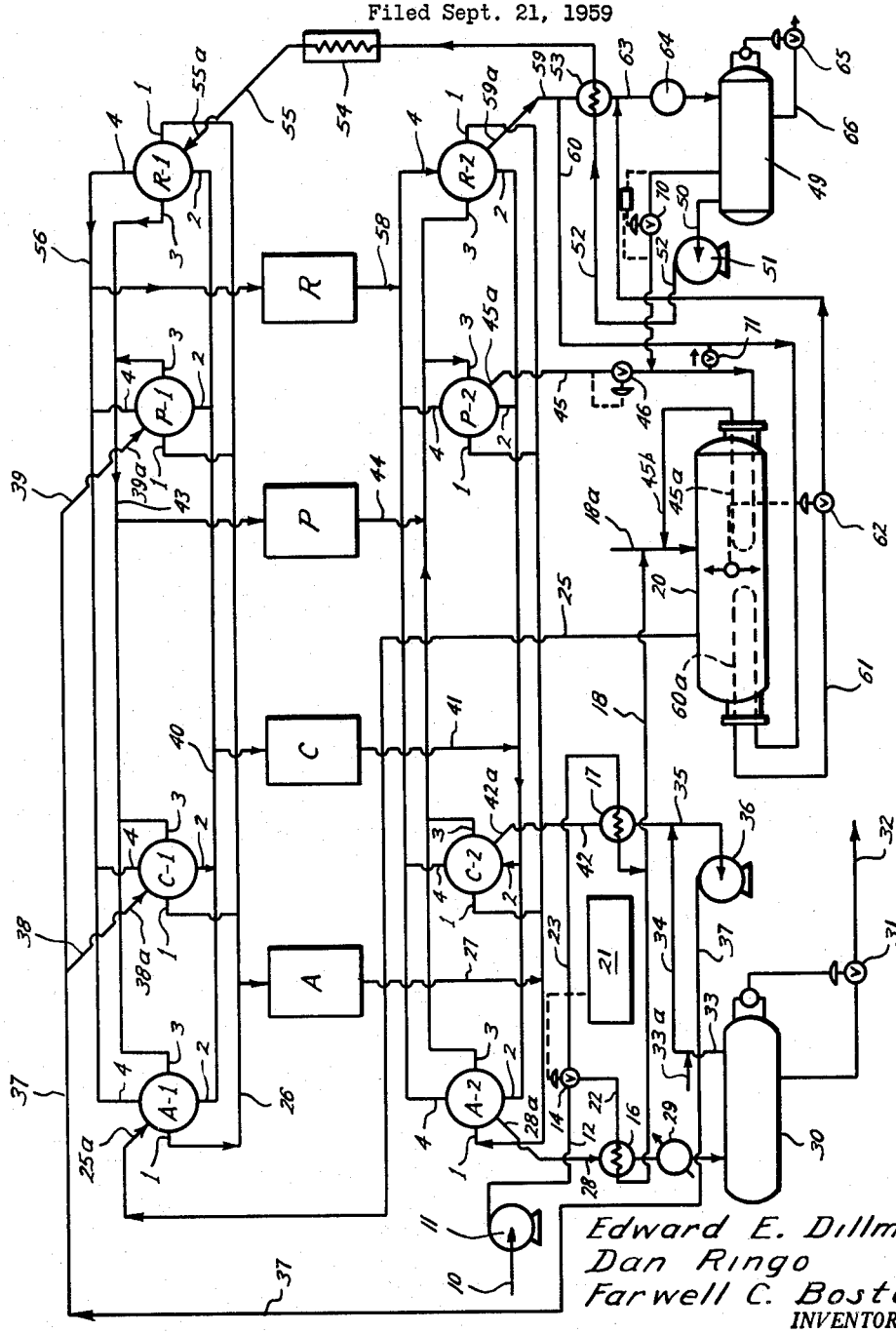

3,086,065
SEPARATION OF CLOSE BOILING COMPONENTS
Edward E. Dillman and Dan Ringo, Houston, Tex., and Farwell C. Boston, Shreveport, La., assignors to Engineers & Fabricators, Inc., Houston, Tex., a corporation
Filed Sept. 21, 1959, Ser. No. 841,304
4 Claims. (Cl. 260—676)

This invention relates to a new and improved process for the separation of close boiling components.

An object of this invention is to provide a new and improved process for the separation of close boiling components without using the fractional distillation heretofore used.

An important object of this invention is to provide a new and improved process for the separation of close boiling compounds by an adsorption cycle wherein an inert gas is included within the cycle.

Another object of this invention is to provide a new and improved process for the separation of close boiling compounds which requires relatively low heat consumption as compared to the fractional distillation process heretofore used.

A further object of this invention is to provide a new and improved process for the separation of close boiling compounds wherein a substantially pure product is obtained without reducing the pressure during the regeneration of the adsorbing bed.

Still another object of this invention is to provide a new and improved adsorbption process wherein a liquid mixture is vaporized and is passed through an adsorbent with an inert gas, with the vaporizing being accomplished in the presence of an inert gas to enable such vaporization to be accomplished at a fairly low temperature due to the presence of the inert carrier gas, whereby the temperature is sufficiently low to allow heat exchange with other hot streams in the process or system which must be cooled.

A particular object of this invention is to provide a new and improved process for the separation of close boiling compounds which involves the following cycle, adsorption, regeneration, purging and cooling, followed by adsorption again, whereby the adsorption bed is regenerated to the maximum extent and is properly cooled prior to the next adsorption step.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein the FIGURE in the drawing is a schematic flow sheet of the process of this invention in its preferred form.

Briefly, the process of this invention relates to the separation of relatively close boiling compounds by selective adsorption rather than by the fractional distillation processes heretofore used. In carrying out the process of this invention, an inert gas is circulated in conjunction with the compounds which are treated and are ultimately separated from each other. In the preferred form of the invention, the process is a continuous one with the inert gas remaining in the system and with only small amounts of make-up of the inert gas being required. In general terms, the method or process of this invention involves adsorption, regeneration, purging, and cooling stages in a continuous and repetitive sequence, with the feed mixture which is to be separated being vaporized prior to adsorption. The pressure of the vaporized compounds and the inert gas in the system remains substantially constant throughout the system which contributes to the efficiency of the process and the effectiveness of the separation of the components in the feed mixture.

Considering the invention in detail, the FIGURE of the drawing illustrates the preferred form of the process or system of this invention. As shown in such flow diagram, the feed mixture of the compounds or components to be separated is introduced at 10 by means of a charge pump 11 of any conventional construction. In the preferred form of the invention, a mixture of iso hexane and normal hexane would be introduced at line 10 by means of the pump 11, and therefore, the process of this invention will be initially described with respect to the separation of the mixture of the iso hexane and the normal hexane. The feed mixture is pumped with the pump 11 through line 12 to a valve 14 in the line 12 which is preferably a three-way valve which controls the flow of the feed mixture to either or both heat exchangers 16 and 17, as desired, to control the heating of the feed mixture prior to its flow through line 18 to a feed vaporizer tank 20. A flow ratio controller 21 of any suitable type is indicated in the drawings for controlling the valve 14 in accordance with the temperature of the gas so that the maximum heat is imparted to the feed mixture as it flows ultimately through line 18 to the feed vaporizer tank 20. The controller 21 simply determines whether the flow of the feed mixture passing through valve 14 from line 12 will flow through the line 22 to the heat exchanger 16 or through the line 23 to the heat exchanger 17, or whether a portion of such feed mixture will flow to each of the heat exchangers 16 and 17.

In the feed vaporizer tank 20, the feed mixture is vaporized by heating same in a manner hereinafter more fully explained. The feed mixture is thus rendered gaseous or vaporized and is caused to be discharged through line 25 for flow to valve A-1. Actually, there would also be present with the vaporized feed, some inert gas such as nitrogen which would flow into the line 25 from the feed vaporizer tank 20, as will be more fully explained hereinafter. The valve A-1 is a multi-port valve having an inlet designated 25a and outlets designated with the numerals 1, 2, 3 and 4. Such valve is preferably of the type disclosed in copending United States patent application, Serial No. 733,776, filed April 10, 1958, although this invention is not limited thereto.

With the particular cycle of the process or system illustrated in the drawings, the valve A-1 has the outlet opening 1 therefrom open while the outer outlet openings 2, 3 and 4 thereof are closed so that the vaporized feed mixture plus the inert gas therewith flow from the valve A-1 through flow line 26 to the adsorption bed A. Such adsorption bed A has therein an adsorbent capable of adsorbing one of the components or compounds in the mixture without any appreciable adsorption of the other compound or compounds in the mixture. In the preferred form of the invention, wherein two different boiling point hydrocarbons such as iso hexane and normal hexane are in the initial feed mixture and are to be separated, the adsorbent in the adsorption bed A would preferably be a synthetic zeolite, a particular example of which is the 5 Angstrom unit sieve which is sold by the Linde Company. The invention is, however, not limited to any particular adsorbent, since the adsorbent will depend upon the particular compounds or components in the feed mixture which is treated by the process of this invention. When the feed mixture includes the iso hexane and the normal hexane, the adsorbent, synthetic zeolite, will preferentially or selectively adsorb the normal hexane and therefore the iso hexane and the inert gas, nitrogen, will flow from the adsorption unit A through line 27 to a multi-port valve A-2 which has inlet ports 1, 2, 3 and 4, and an outlet 28a connected with line 28.

The valve A-2 is therefore a multi-port rotary valve of the type previously referred to in connection with the valve A-1, and it has its port 1 open and its port 2, 3 and 4 closed in the particular cycle illustrated in the drawings.

The gas in line 28 flows through the heat exchanger 16 to impart some of its heat to the feed mixture flowing through the heat exchanger 16. A condenser 29 is also provided in the line 28 for effecting a condensation of the gas or vapor in the line 28 prior to its flow to an accumulator or tank 30. Such accumulator 30 thus collects the iso hexane which has been condensed, and by means of a liquid level control valve 31 or other suitable control means, the discharge of the liquid iso hexane is obtained through line 32 for flow to storage or the point of use as a substantially pure product. The nitrogen which was present in the line 28 and which also moved with the iso hexane into the accumulator 30 is discharged therefrom through an outlet line 33 extending from the tank 30. It is to be noted that an inlet line 33a is provided with the line 33 for the initial introduction into the system of the nitrogen or other inert gas used in the system, but after the system is in operation and the initial charge of the inert gas is provided in the system, the make-up nitrogen or inert gas is preferably introduced at line 18a.

The substantially pure inert gas flows from line 33 to a gas circulator 36 through lines 34 and 35. The gas circulator 36 circulates the inert gas through line 37 to lines 38 and 39. The line 38 is connected with an inlet opening 38a of a multi-port valve C-1 which has outlet openings 1, 2, 3 and 4. Such multi-port valve C-1 is a multi-port rotary valve of the type previously referred to in connection with the valve A-1, and in the particular phase of the cycle illustrated, the port 2 of the valve C-1 is open while the ports 1, 3 and 4 are closed so that the gas flowing through the valve C-1 passes to line 40 which is connected with the adsorption bed C for the purpose of cooling such bed subsequent to the regeneration and purging thereof and prior to the next use of the bed C for adsorption, as will be more fully explained hereinafter. The cooling gas passing through the bed C flows through line 41 to a multi-port discharge valve C-2 which has inlet openings 1, 2, 3 and 4, with the opening 2 being open and the openings 1, 3 and 4 being closed. The valve C-2 is identical with the valve A-1 in the preferred form of the invention and is likewise a multi-port rotary valve which has a discharge or outlet opening or port 42a connected with a discharge line 42 which feeds the cooling gas through the heat exchanger 17 to impart some of the heat thereof to the incoming feed mixture in line 23 which passes through the heat exchanger 17. The gas being discharged from the heat exchanger 17 flows to the line 35 and is mixed with the inert gas coming from line 34 and is recirculated with the gas circulator 36. Thus, the bed C is in effect being cooled by the circulation of the inert gas in a closed loop or circuit.

The gas from the inlet line 39 passes through an inlet opening 39a into a multi-port rotary valve P-1 which has outlet openings 1, 2, 3 and 4 therewith. The multi-port rotary valve P-1 is preferably identical with the multi-port rotary valve A-1 previously referred to, and in the sequence of the cycle illustrated in the drawings, the outlet ports 1, 2 and 4 are closed and the outlet port 3 is open so that the gas flows to line 43 and then to the bed P. The bed P like the beds A and C previously referred to has an adsorbent therein, and in the particular sequence illustrated, the bed or unit P is on the purge stage of the cycle. After the gas passes through the bed P it is discharged therefrom through line 44 and flows to multi-port rotary valve P-1 through its inlet opening 3 which is open while its other inlet openings 1, 2 and 4 are closed. The valve P-1 is preferably identical with the valve A-1 previously referred to and is provided with an outlet opening or port 45a which is connected with a discharge line 45. The line 45 has an emergency valve 46 provided therein for cutting off the flow of the gas in the line 45 if the temperature in the feed vaporizer 20 becomes too high, but normally the valve 46 is open. The line 45 is connected with a coil 45a which is positioned within the feed vaporizer tank 20 below the level of the liquid feed therein, preferably, for the purpose of imparting heat to such feed to facilitate the vaporization of the feed mixture or liquid. The coil 45a discharges to a line 45b which connects with the line 18a to return the gas into the feed vaporizer tank 20 so that such gas can flow with the vaporized feed mixture through line 25 to the adsorption unit A, as previously explained. Because of the fact that the nitrogen or other inert gas is introduced into the feed vaporizer, a lower vaporization temperature is required to vaporize the feed liquid in the tank 20.

The adsorption bed R shown in the drawings also includes the adsorbent such as the synthetic zeolite and it is on the regeneration phase of the cycle which immediately follows the adsorption phase illustrated with the adsorption bed A in the drawings. The regeneration gas is obtained from the accumulator tank 49 which has the accumulated normal hexane or other separated component therein. The regeneration gas is taken from the accumulator tank 49 through line 50 and such gas consists of a lean nitrogen-normal hexane mixture in the preferred form of the invention. Such regeneration gas is circulated with a gas circulator 51 through line 52 and heat exchanger 53 before being passed to a heater 54. In the heater 54, heat is applied by gas or any other suitable source of heat to increase the heat of the regeneration gas to a temperature within the range of 650° F. to 750° F. in the preferred form of the invention. It should be pointed out that such temperature is higher than the adsorption temperature which normally would take place at approximately 400° F. to 450° F. in the preferred form of the invention. It should also be noted that the pressure of the gas in the system is preferably at about 400 pounds per square inch in both the regeneration phase of the system and the other three beds indicated in the drawings by the letters A, C, and P.

The hot regeneration gas flows from the heater 54 through line 55 and inlet 55a to multi-port rotary valve R-1. Such multi-port rotary valve R-1 is preferably a valve of the type previously referred to in connection with the multi-port rotary valve A-1. The valve R-1 has multi-ports 1, 2, 3 and 4, with the ports 1, 2 and 3 being closed and the port 4 being open so that the regeneration gas flows to line 56 and then to the bed R which is on the regeneration phase of the cycle. The regeneration gas replaces the previously adsorbed normal hexane in the bed or unit R so that it leaves the bed R with the inert gas such as nitrogen therein and with only a very small amount of the normal hexane or other compound which has previously been adsorbed. The desorbed compound such as the normal hexane then flows from the bed R through an outlet or discharge line 58 to a multi-port rotary valve R-2 which has inlet openings 1, 2, 3 and 4 therewith. The multi-port rotary valve R-2 is preferably of the same type previously referred to in connection with the valve A-1 and it has an outlet opening 59a therewith which connects with discharge line 59 through which the desorbed normal hexane flows. A portion of the desorbed normal hexane flows from the line 59 through a line 60 which is connected with a coil 60a within the feed vaporizer tank 20, preferably below the level of the liquid therein. The return side of the coil 60a is connected with a return line 61 which returns the flow of the desorbed normal hexane through a liquid level control valve 62 and back to line 63 which is on the discharge side of the heat exchanger 53. The liquid level control valve 62 merely controls the level of the liquid or feed mixture in the tank 20. The portion of the desorbed normal hexane which passed from line 59 through the heat exchanger 53 joins with the desorbed normal hexane coming from the line 61 and they both flow through line 63 to a condensor 64 which condenses the vapors thereof to liquify or condense the normal hexane vapors so that such normal hexane accumulates in the accumulator tank 49 as a liquid. The lean nitrogen-normal hexane gas, previously referred to, passes from the tank 49 for a continuation of the regeneration phase of the cycle. A liquid level control valve 65 is mounted on a product discharge line 66 so that the substantially pure normal hexane product is obtained therefrom.

For maintaining a pressure balance between the bed R on regeneration and the three vessels which are not on the regeneration cycle, which as illustrated in the drawings would be the beds A, C and P, a differential pressure control 70 of conventional construction and a check valve 71 are provided in the system so that when necessary, a slight amount of fluid flow can be directed as indicated by the arrows through the valve 70 and then returned through the check valve 71 flowing from left to right at the check valve 71 as indicated in the drawings.

Considering now the normal sequence of operations in carrying out the process of this invention, it will be understood that the four beds A, C, P and R are on their various phases simultaneously and the sequence of operation is as follows: adsorption, regeneration, purging, and cooling. In other words each of the beds A, C, P and R eventually goes through each of the four stages of the cycle or sequence. Thus, the bed A which is on adsorption in the drawings, would next be switched to the regeneration cycle by the turning of all of the valves A–1, C–1, P–1 and R–1, A–2, C–2, P–2 and R–2 simultaneously to shift them so that the next multi-port opening is open in the sequence for each valve. For example, after the adsorption in the A has taken place to a sufficient extent to saturate the bed A, or substantially saturate the same with the normal hexane or other component adsorbed selectively therein, all of the multiport rotary valves would be rotated to the next position. Thus, the valve A–1 would be shifted so that the port 2 thereof would be open while the ports 1, 3 and 4 would be closed so that the incoming feed mixture would be directed to the bed C for adsorption. The valve C–1 would be rotated so that the outlet port 3 thereof would be open while the ports 1, 2 and 4 are closed, thereby directing the cooling gas through the adsorption bed P for cooling the same. The valve P–1 would be shifted so that the port 4 would be open while the ports 1, 2 and 3 would be closed so that the purging gas from the line 39 would flow through the bed R for purging same. The valve R–1 would be rotated so that the port 1 thereof would be open while the ports 2, 3 and 4 would be closed, whereby the regeneration gas would flow to the adsorption be A to regenerate same. The valves A–2, C–2 P–2 and R–2 would likewise be shifted so that the ports 2, 3, 4, and 1, respectively, are open while the other ports of each of the such valves are closed.

Thereafter, for the next cycle, the multi-port rotary valves are again rotated in the same rotational direction so that the bed A which was regenerated is then on the purge phase, the bed C which was previously on the adsorption phase is then on the regeneration phase, the bed P which was previously on the cooling phase is then on the adsorption phase and the bed R which was previously on the purging phase is then on the cooling phase. The next rotation of the multi-port rotary valves is likewise in the same rotational direction. Thus, the final sequence or shift of the valves would place the adsorption bed A on the cooling phase, the adsorption bed C on the purge phase, the adsorption bed P on the regeneration phase and the adsorption bed R on the adsorption phase. The next rotation of the multiport rotary valves would of course place the beds A, C, P and R in the particular sequence illustrated in the drawings so that they would again revert to the beginning of the cycle. Such cycle would be repeated as explained, continuously as required.

During the carrying out of the process of this invention, the rate of the gas circulation in the regeneration phase or loop should be kept in proportion to the rate of the pumping or circulation with the pump 11 of the feed mixture from line 10. It is to be noted that the invention is not limited to the example described wherein the normal hexane and the iso hexane were separated, but the invention contemplates a process wherein at least two different boiling point components are separated by the adsorption process, with one of the components being adsorbable in the particular adsorbent and the other one of which is not adsorbable therein. For example, ethane could be separated from a mixture of ethane and propane and heavier hydrocarbons. Therefore, it is important to note that the invention is not limited to the separation of only two components or compounds, but could involve the separation of one of the compounds or components in a mixture from the others. With respect to the inert gas, nitrogen is preferably used, but other inert gases such as hydrogen and helium could be used, although they are not as desirable under normal circumstances. The particular temperatures and pressures which have been referred to in connection with the process may be varied depending upon the equilibrium conditions of the feed mixture.

From the foregoing description of this invention, it is believed evident that this invention provides a process for the separation of relatively close boiling compounds without using the fractional distillation heretofore used and therefore the great quantities of heat and the correspondingly large cooling loads required for fractional distillation are reduced by this invention.

It is to be understood that the invention hereof is not to be limited to the particular embodiment disclosed herein.

What is claimed is:

1. A process for the separation of close boiling hydrocarbon components in a mixture, comprising the steps of, passing the mixture and an inert gas through an adsorbent capable of adsorbing one of said components without any appreciable adsorption of the other of said components at a predetermined pressure and in only one direction to selectively adsorb said one of said components, regenerating the adsorbent by introducing a regenerating gas including a lean mixture of said inert gas and said adsorbed one of said components into said adsorbent at substantially the same pressure as said predetermined pressure, thereafter passing a purge gas mixture of said inert gas and the unadsorbed component through said adsorbent to purge the adsorbent of substantially all of said one of said components which was adsorbed on the adsorption step, then passing a cooling gas through said adsorbent to cool same for conditioning the adsorbent for subsequent adsorption, and then repeating the above sequence of steps as desired.

2. A process for the separation of normal hydrocarbons and non-normal hydrocarbons, comprising the steps of, passing a mixture of normal and non-normal hydrocarbons through an adsorbent which selectively adsorbs the normal hydrocarbon, thereafter regenerating said adsorbent by introducing a regenerating gas which is a lean mixture of an inert gas and said normal hydrocarbon, thereafter passing a purge gas mixture of said inert gas and the non-normal hydrocarbon through said adsorbent to purge the adsorbent of substantially all of said normal hydrocarbon which was adsorbed on the adsorption step, then passing a cooling gas through said adsorbent to cool same for conditioning the absorbent for subsequent adsorption, and then repeating the above sequence of steps as desired.

3. In a system having at least four adsorption beds, a method of separating close boiling components, comprising the steps of, passing a mixture of at least two components and an inert gas through the first of the beds to adsorb one of said components, flowing the inert gas and the unadsorbed component to a second one of said beds to purge said bed of the adsorbed component and to a third one of said beds to cool same prior to subsequent use for adsorption, circulating a heated regeneration gas including a mixture of said inert gas and said adsorbed component through the fourth one of said beds to remove a substantial portion of previously adsorbed component therefrom, and thereafter shifting the flow of the gases through said beds to cause each of said beds to successively serve for the aforesaid adsorption, regeneration, purging and cooling steps.

4. In a system having at least four adsorption beds, a method of separating a normal hydrocarbon component from a non-normal hydrocarbon component in a gas mixture, comprising the steps of, passing said mixture and an inert gas through the first of the beds to adsorb the normal hydrocarbon component, flowing the inert gas and the non-normal hydrocarbon component to a second one of said beds to purge said bed of the normal hydrocarbon component and to a third one of said beds to cool same prior to subsequent use for adsorption, circulating a heated regeneration gas including a mixture of said inert gas and the normal hydrocarbon through the fourth one of said beds to remove a substantial portion of previously adsorbed normal hydrocarbon therefrom, and thereafter shifting the flow of the gases through said beds to cause each of said beds to successively serve for the aforesaid adsorption, regeneration, purging and cooling steps.

References Cited in the file of this patent

UNITED STATES PATENTS

| | | |
|---|---|---|
| 2,439,372 | Simpson | Apr. 6, 1948 |
| 2,818,455 | Ballard et al. | Dec. 31, 1957 |
| 2,881,862 | Fleck et al. | Apr. 14, 1959 |
| 2,889,893 | Hess et al. | June 9, 1959 |
| 2,893,955 | Coggeshall | July 7, 1959 |
| 2,952,630 | Eggertsen et al. | Sept. 13, 1960 |
| 2,987,471 | Eggertsen | June 6, 1961 |